US009858819B2

(12) United States Patent
Povey et al.

(10) Patent No.: US 9,858,819 B2
(45) Date of Patent: Jan. 2, 2018

(54) TRAFFIC CONTROL SYSTEM HAVING DEADLOCK AVOIDANCE FUNCTIONALITY

(71) Applicant: Caterpillar Inc., Peoria, IL (US)

(72) Inventors: Dean G. Povey, Queensland (AU); Michael Siemer, Queensland (AU)

(73) Assignee: Caterpillar Inc., Peoria, IL (US)

( * ) Notice: Subject to any disclaimer, the term of this patent is extended or adjusted under 35 U.S.C. 154(b) by 17 days.

(21) Appl. No.: 15/014,917

(22) Filed: Feb. 3, 2016

(65) Prior Publication Data

US 2017/0221364 A1    Aug. 3, 2017

(51) Int. Cl.
*G08G 1/16*    (2006.01)
*G08G 1/0965*    (2006.01)

(52) U.S. Cl.
CPC ........... *G08G 1/164* (2013.01); *G08G 1/0965* (2013.01); *G08G 1/163* (2013.01); *G08G 1/166* (2013.01)

(58) Field of Classification Search
CPC ........ G08G 1/164; G08G 1/165; G08G 1/166; G08G 1/167; G08G 1/168; G08G 1/163; G08G 1/0965
USPC .................................................. 701/117, 301
See application file for complete search history.

(56) References Cited

U.S. PATENT DOCUMENTS

| 5,283,739 | A | 2/1994 | Summerville et al. | |
|---|---|---|---|---|
| 6,480,783 | B1* | 11/2002 | Myr | G01C 21/3492 340/990 |
| 6,799,100 | B2 | 9/2004 | Burns et al. | |
| 7,305,287 | B2 | 12/2007 | Park | |
| 8,209,114 | B2* | 6/2012 | Ishikawa | G08G 1/0104 340/905 |
| 8,566,009 | B2 | 10/2013 | Ozaki et al. | |
| 8,996,228 | B1* | 3/2015 | Ferguson | G01C 21/3461 348/118 |
| 9,056,395 | B1* | 6/2015 | Ferguson | B60W 30/00 |
| 9,142,127 | B1* | 9/2015 | McDevitt-Pimbley | G08G 1/091 |
| 2001/0029425 | A1* | 10/2001 | Myr | G01C 21/3492 701/117 |
| 2008/0004791 | A1* | 1/2008 | Sera | G08G 1/096827 701/117 |
| 2009/0033540 | A1* | 2/2009 | Breed | B60N 2/2863 342/29 |

(Continued)

FOREIGN PATENT DOCUMENTS

JP        H 11143536      5/1999
WO    WO 2015151291    10/2015

*Primary Examiner* — Atul Trivedi
(74) *Attorney, Agent, or Firm* — Finnegan, Henderson, Farabow, Garrett & Dunner, LLP (57) ABSTRACT

A traffic control system is disclosed as having a locating device configured to generate a location signal indicative of a location of each of a plurality of machines. The traffic control system may also have an onboard controller configured to regulate operation of the plurality of machines based on the location signal, a communication device, and a worksite controller. The worksite controller may be configured to determine a first route for a first of the plurality of machines, and to determine if a first lane of the first route is blocked by a second of the plurality of machines. The worksite controller may also be configured to determine if a second lane of the first route intersects with a second route of the second of the plurality of machines, and to selectively grant permission for travel of the first of the plurality of machines through the second lane.

20 Claims, 4 Drawing Sheets

(56) References Cited

U.S. PATENT DOCUMENTS

| | | | |
|---|---|---|---|
| 2009/0043462 A1* | 2/2009 | Stratton | E02F 9/26 |
| | | | 701/50 |
| 2009/0109061 A1* | 4/2009 | McNew | G08G 1/164 |
| | | | 340/928 |
| 2009/0222186 A1* | 9/2009 | Jensen | G05D 1/0011 |
| | | | 701/96 |
| 2009/0326752 A1* | 12/2009 | Staempfle | G01S 13/931 |
| | | | 701/31.4 |
| 2010/0010703 A1* | 1/2010 | Coats | G05D 1/024 |
| | | | 701/29.6 |
| 2010/0216498 A1* | 8/2010 | Mintah | H04L 45/04 |
| | | | 455/507 |
| 2012/0299695 A1* | 11/2012 | McDaniel | G05D 1/0238 |
| | | | 340/3.1 |
| 2013/0002455 A1* | 1/2013 | Koehrsen | G08G 1/20 |
| | | | 340/989 |
| 2013/0006468 A1* | 1/2013 | Koehrsen | G08G 1/20 |
| | | | 701/36 |
| 2013/0006482 A1* | 1/2013 | Hukkeri | G01C 7/04 |
| | | | 701/50 |
| 2013/0116915 A1* | 5/2013 | Ferreira | G08G 1/163 |
| | | | 701/117 |
| 2013/0279392 A1* | 10/2013 | Rubin | H04W 72/005 |
| | | | 370/312 |
| 2014/0032035 A1 | 1/2014 | Thomson | |
| 2014/0063232 A1* | 3/2014 | Fairfield | G06K 9/78 |
| | | | 348/118 |
| 2014/0067187 A1* | 3/2014 | Ferguson | B60W 30/00 |
| | | | 701/28 |
| 2015/0221222 A1 | 8/2015 | Hamada et al. | |

* cited by examiner

TRAFFIC CONTROL SYSTEM HAVING DEADLOCK AVOIDANCE FUNCTIONALITY

TECHNICAL FIELD

The present disclosure is directed to a traffic control system and, more particularly, to a traffic control system having deadlock avoidance functionality.

BACKGROUND

Mobile machines such as haul trucks, motor graders, water trucks, and other large equipment are concurrently utilized at a common worksite to accomplish a variety of tasks. These machines can be large, difficult to operate, heavy, and slow to respond. In addition, the travel routes of the machines can intersect with (e.g., coincide with and/or or partially overlap with) each other. Accordingly, it is important to control the traffic pattern of these machines in order to reduce the opportunity for collision, machine damage, and deadlock to occur. This may be particularly important when the machines are autonomously and/or remotely controlled.

One attempt at traffic control for unmanned vehicles is described in U.S. Pat. No. 8,566,009 that issued to Ozaki et al. on Oct. 22, 2013 ("the '009 patent"). Specifically, the '009 patent describes a travel control apparatus operable to determine travel routes for each of the unmanned vehicles. During operation, each vehicle will request a travel route reservation from a current location to a desired end point. The travel control apparatus will then determine if the requested reservation intersects with an already reserved route of another vehicle. If an intersection exists, the travel control apparatus will make a reservation corresponding to only a portion of the requested route, up to a terminal edge of the already reserved route. The travel control apparatus will then determine if deadlock exists between the two reserved routes. If deadlock exists, the travel control apparatus will release the reservation of the corresponding vehicle having a lower travel priority.

Although the travel control apparatus of the '009 patent may help avoid collision and deadlock, it may still be less than optimal. In particular, the travel control apparatus may be inefficient and wasteful by reserving routes for individual vehicles that have the potential for deadlock. In some instances, the travel control apparatus may have to reserve and release routes multiple times before picking a route that is acceptable.

The disclosed traffic control system is directed to overcoming one or more of the problems set forth above and/or other problems of the prior art.

SUMMARY

One aspect of the present disclosure is directed to a traffic control system for use with a plurality of mobile machines operating at a worksite. The traffic control system may include a locating device positioned onboard each of the plurality of mobile machines and configured to generate a location signal indicative of a location of a corresponding one of the plurality of mobile machines at the worksite. The traffic control system may also include an onboard controller positioned onboard each of the plurality of mobile machines and configured to regulate operation of a corresponding one of the plurality of mobile machines based on the location signal, a communication device positioned onboard each of the plurality of mobile machines, and a worksite controller in communication with the locating device and the onboard controller via the communication device. The worksite controller may be configured to determine a first route for a first of the plurality of mobile machines from a current location to a final destination based on the location signal, and to determine if a first lane of the first route is blocked by a second of the plurality of mobile machines. The worksite controller may also be configured to determine if a second lane of the first route intersects with a second route of the second of the plurality of mobile machines, and to selectively grant permission to the onboard controller for travel of the first of the plurality of mobile machines through the second lane prior to reaching the first lane while the first lane is blocked.

Another aspect of the present disclosure is directed to a method for controlling traffic of a plurality of mobile machines operating at a worksite. The method may include generating location signals indicative of locations of the plurality of mobile machines, and determining a plurality of routes for the plurality of mobile machines based on the location signals. The method may also include determining if a first lane of a first route associated with a first of the plurality of mobile machines is blocked by a second of the plurality of mobile machines, determining if a second lane of the first route interferes with a second route of the second of the plurality of mobile machines, and selectively causing the first of the plurality of mobile machines to stop in a lane of the first route other than the second lane prior to reaching the first lane while the first lane is blocked.

Yet another aspect of the present disclosure is directed to a non-transitory computer readable medium containing computer-executable programming instructions for performing a method of traffic control for a plurality of mobile machines operating at a worksite. The method may include generating location signals indicative of locations of the plurality of mobile machines at the worksite, and determining a plurality of routes for the plurality of mobile machines based on the location signals. The method may also include determining if a first lane of a first route associated with a first of the plurality of mobile machines is blocked by a second of the plurality of mobile machines, determining if a second lane of the first route interferes with a second route of the second of the plurality of mobile machines, and selectively causing the first of the plurality of mobile machines to stop in a lane of the first route other than the second lane prior to reaching the first lane while the first lane is blocked.

DETAILED DESCRIPTION

Figure 1:
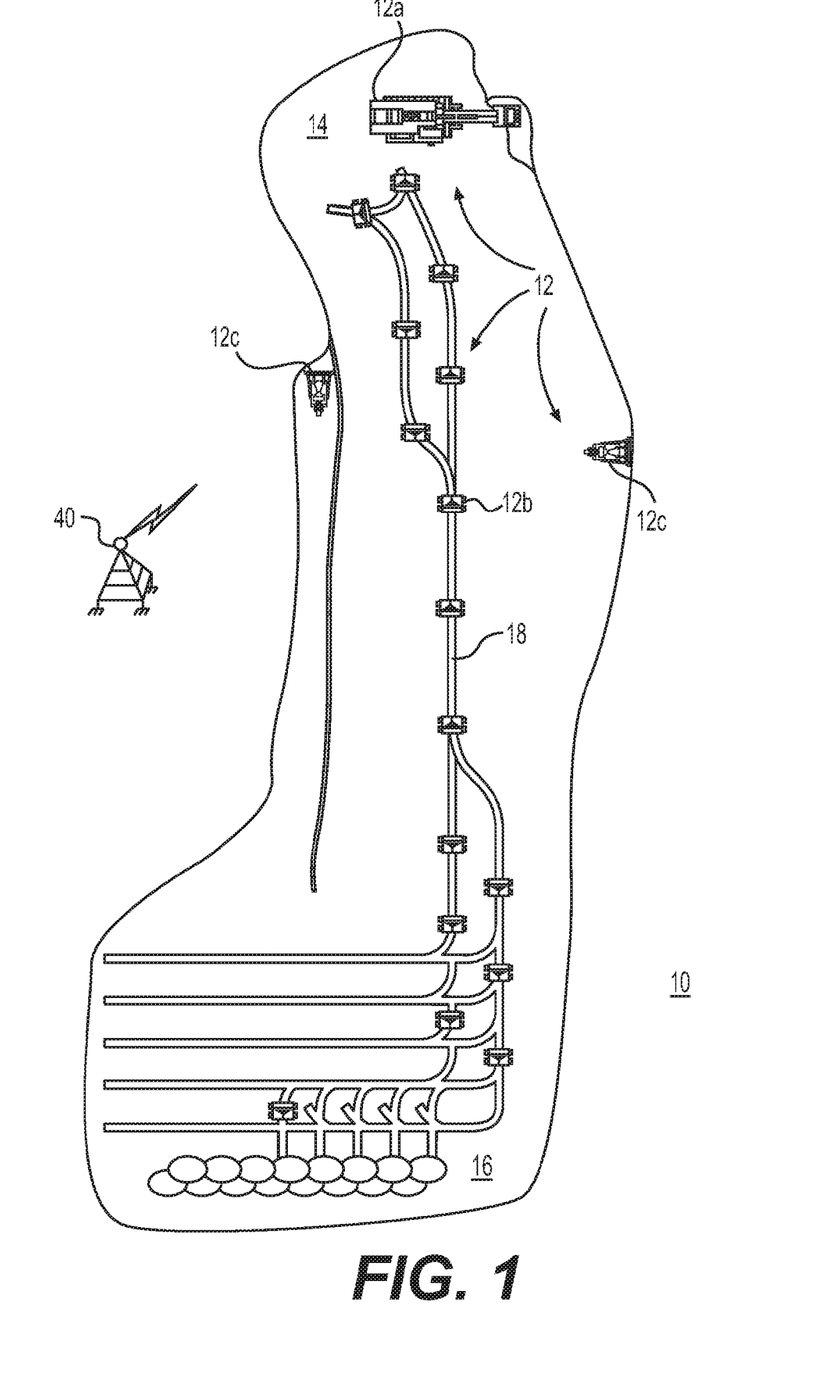
FIG. 1 is a diagrammatic illustration of an exemplary disclosed worksite.

FIG. 1 illustrates an exemplary worksite 10 with a plurality of mobile machines 12 performing different tasks at various locations of worksite 10. Worksite 10 may include, for example, a mine site, a landfill, a quarry, a construction site, a road worksite, or any other type of worksite. The tasks may be associated with any work activity appropriate at worksite 10, and may require machines 12 to generally traverse worksite 10.

Figure 2:
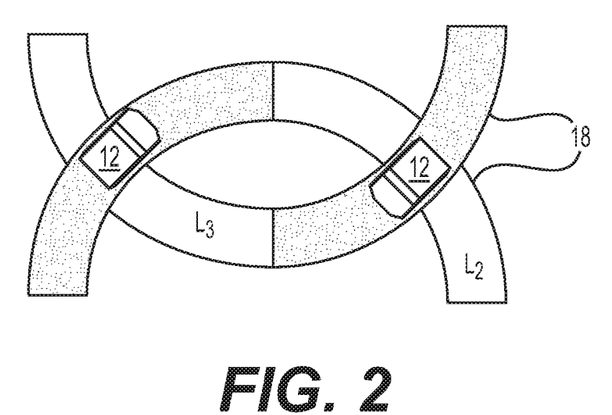
FIGS. 2 and 3 are virtual representations of a portion of the worksite of FIG. 1.
Figure 3:
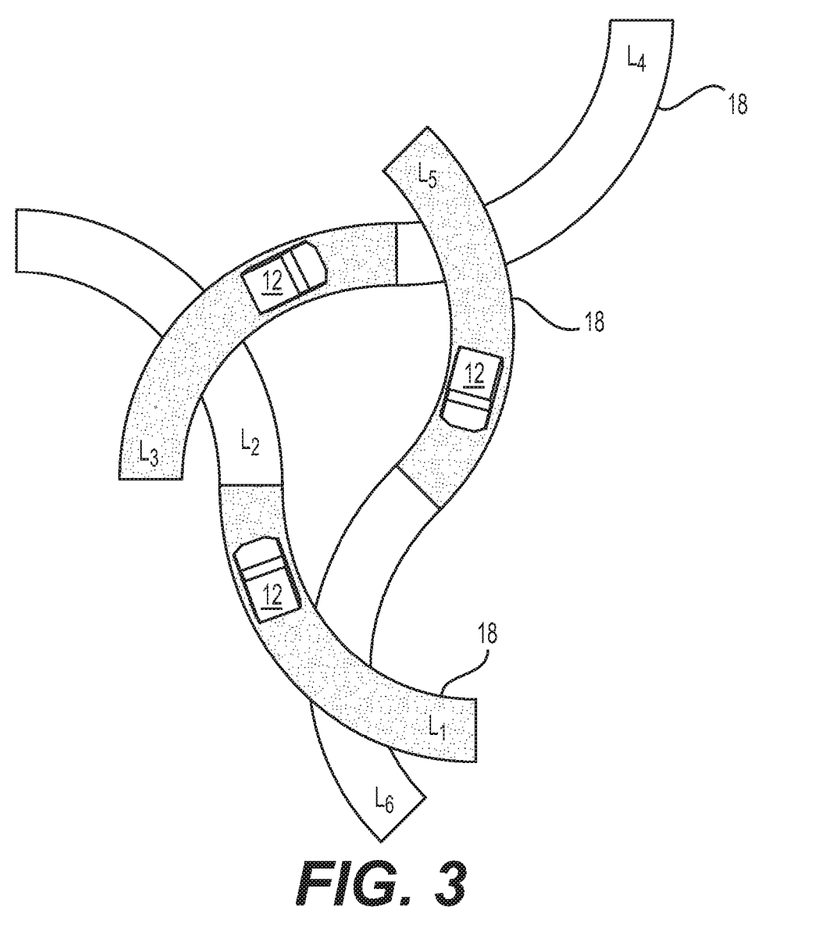

Worksite 10 may include multiple locations designated for particular purposes. For example, a first location 14 may be designated as a load location, while a second location 16 may be designated as a dump location. One or more travel routes 18 may generally extend between load location 14 and dump location 16. As shown in FIGS. 2 and 3, each travel route 18 may be divided into multiple segments or lanes (labeled as $L_1, L_2, \ldots L_n$) that, if followed sequentially by a particular machine 12, will lead that machine 12 from its current location to its desired location at load location 14, dump location 16, or another resource location of worksite 10. The lanes may be assembled into unique travel routes 18 for each machine 12 and, as will be described in more detail below, structuring of the assemblies may aid in regulating the movements of machines 12 at worksite 10.

Any number and types of machines 12 may simultaneously and cooperatively operate at worksite 10. For example, a first type of machine (e.g., an excavator shown in FIG. 1) 12a may be stationed at load location 14 and assigned to fill a second type of machine (e.g., a haul truck) 12b with material. A third type of machine (e.g., a dozer, a motor grader, a water truck, and/or a service vehicle) 12c may be tasked with traveling up and down travel route 18 to condition travel route 18, to clean up load and/or dump locations 14, 16, and/or to service other machines 12 at any location of worksite 10. Machines 12 may be self-directed machines configured to autonomously traverse the changing terrain of worksite 10, manned machines configured to traverse worksite 10 under the control of a local or remote operator, or hybrid machines configured to perform some functions autonomously and other functions under the control of an operator.

Figure 4:
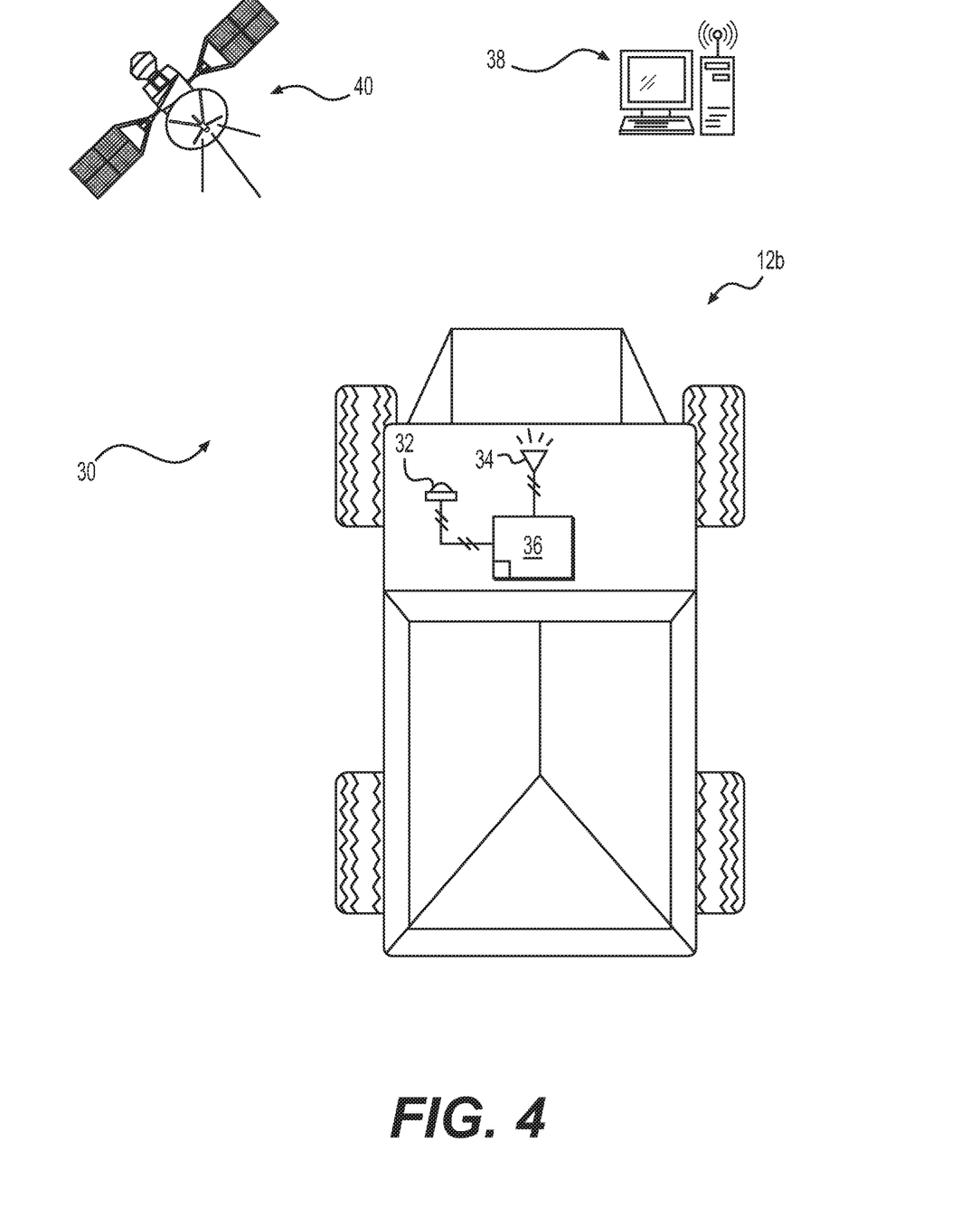
FIG. 4 is a diagrammatic illustration of an exemplary disclosed control system that may be used to manage traffic at the worksite of FIG. 1.

As shown in FIG. 4, each machine 12 (a haul truck is shown by way of example only) may be equipped with components of a system 30 that facilitate traffic (e.g., deadlock) management at worksite 10. System 30 may include, among other things, a locating device 32, a communication device 34, and an onboard controller 36 connected with each of locating device 32 and communication device 34. System 30 may additionally include an offboard or worksite controller 38 that is capable of communication with each onboard controller 36 via corresponding communication devices 34.

As each machine 12 travels about worksite 10, a Global Navigation Satellite System (GNSS) or other tracking device or system 40 may communicate with locating device 32 to monitor the movements of machine 12 and generate corresponding location signals. The location signals may be directed to onboard controller 36 and/or worksite controller 38 for comparison with an electronic map of worksite 10 and for further processing. The further processing may include, among other things, determining a current location of each machine 12; a distance between machines 12; boundaries of the lanes; speeds of machines 12; and/or projected or assigned travel routes 18 of machines 12.

Communication device 34 may facilitate communication between onboard controllers 36 and/or between onboard controllers 36 and worksite controller 38. This communication may include, for example, the coordinates, speeds, and/or travel routes 18 of machines 12 generated based on signals from locating device 32. The communication may also include notification of lane boundaries, and/or identification of particular lanes that have been authorized for use by certain machines 12. Data messages associated with system 30 may be sent and received via a wireless communication link. The wireless communications may include satellite, cellular, infrared, and any other type of wireless communications that enable communication device 34 to exchange information between worksite controller 38 and onboard controllers 36.

Onboard controller 36 may embody a single microprocessor or multiple microprocessors that include a means for monitoring, processing, recording, indexing, and/or communicating the location signal, and for selectively and responsively controlling operations of the associated machine 12. For example, onboard controller 36 may include a storage device, a clock, and a processor, such as a central processing unit or any other means for accomplishing a task consistent with the present disclosure. Numerous commercially available microprocessors can be configured to perform the functions of onboard controller 36. It should be appreciated that onboard controller 36 could readily embody a general machine controller capable of controlling numerous other machine functions. Various other known circuits may be associated with onboard controller 36, including signal-conditioning circuitry, communication circuitry, and other appropriate circuitry.

Worksite controller 38 may include any means for monitoring, recording, storing, indexing, processing, and/or communicating various operational aspects of worksite 10 and machines 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 5:
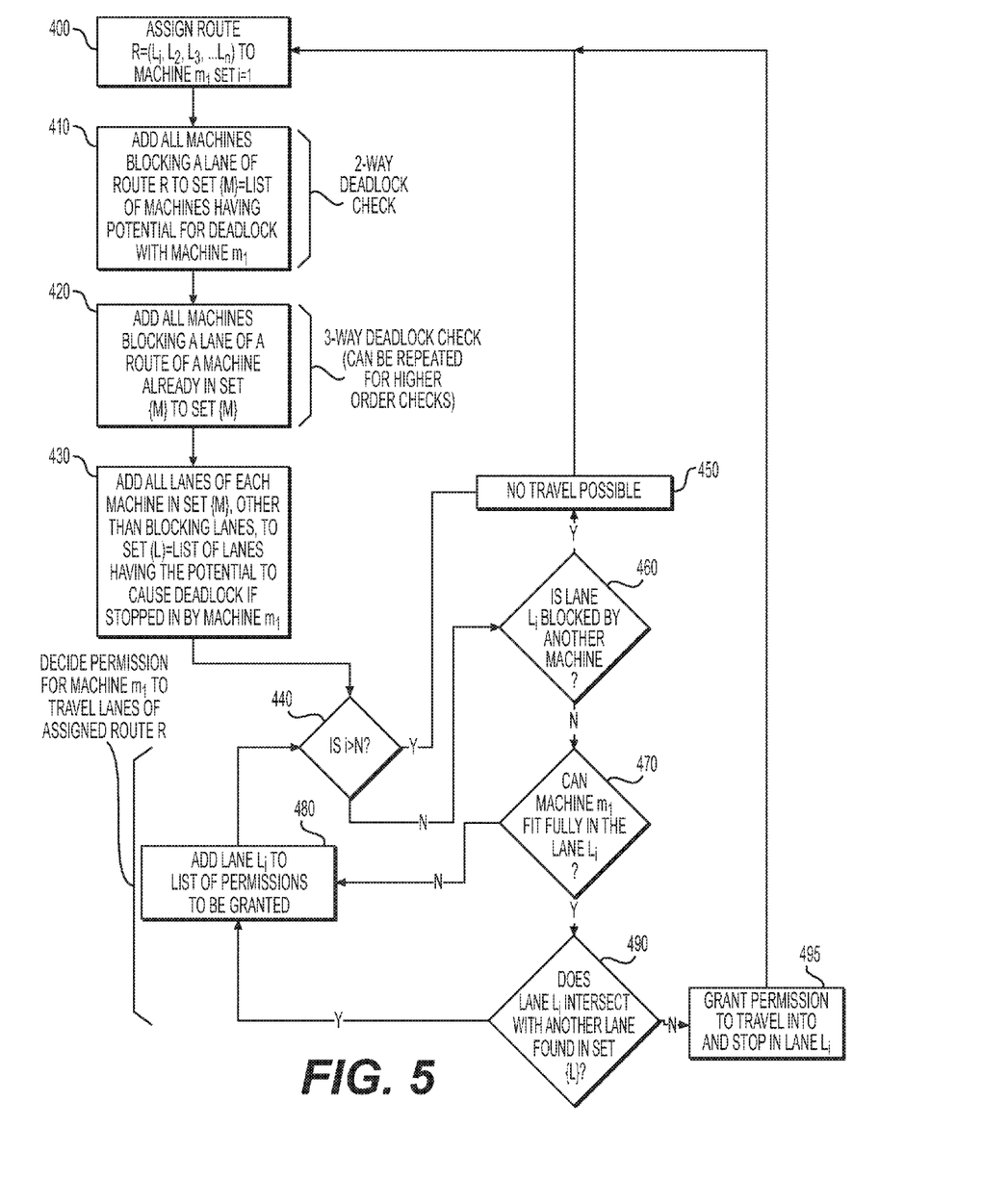
FIG. 5 is a flowchart depicting an exemplary disclosed traffic control method that may be implemented by the system of FIG. 2.

Worksite controller 38 may be configured to execute instructions stored on computer readable medium to perform methods of traffic control at worksite 10. FIG. 5 illustrates one example of these methods. FIG. 5 will be described in more detail in the following section to further illustrate the disclosed concepts.

INDUSTRIAL APPLICABILITY

The disclosed traffic control system finds potential application at any worksite having multiple simultaneously operating machines. The disclosed system finds particular application at worksites having large, cumbersome, autonomously or remotely controlled machines traveling along intersecting routes. The disclosed system may help to reduce a likelihood of collision between the machines and to avoid travel deadlock where two or more machines are inhibiting travel of each other. Operation of system 30 will now be described in detail with reference to FIGS. 2, 3, and 5 to illustrate the process of determining a travel rights for one particular machine 12, hereafter identified as machine $m_1$.

As shown in FIG. 5, operation of system 30 may begin with worksite controller 38 assigning a particular travel route 18 (referred to in FIG. 5 as route R) to machine $m_1$ (Step 400). The travel route R may extend from a current location of machine $m_1$ to a desired final destination, and comprise multiple lanes (e.g., $L_1, L_2, \ldots L_n$) that are sequentially joined end-to-end. For example, with reference to FIG. 2, the machine 12 shown on the left has been assigned a travel route that includes lanes $L_1$ and $L_2$, while the machine 12 shown on the right has been assigned a travel route that includes lanes $L_3$ and $L_4$.

It should be noted that, although worksite controller 38 may determine a complete travel route 18 for machine $m_1$ in step 400, machine $m_1$ may only travel along particular lanes within the corresponding travel route 18 when given permission for such travel. As shown by the shaded regions in FIG. 2, the machine 12 on the left has permission to travel along only lane $L_1$, while the machine 12 on the right has permission to travel along only lane $L_4$. Worksite controller 38 may also initialize a variable "i" at step 400, for later use in the remaining steps of the flowchart of FIG. 5. The remaining steps in the flowchart of FIG. 5 are associated with granting travel to the lanes in the assigned route of machine $m_1$.

As shown in FIGS. 2 and 3, the routes assigned to different machines 12 can intersect (e.g., coincide and/or overlap) with each other. When this occurs, and a first machine 12 is located in an intersecting lane of a second machine 12, the first machine 12 is said to be blocking the lane of the second machine 12. No machine 12 is allowed to enter a blocked lane and, accordingly, must wait for the blocked lane to clear before traveling into the intersection.

In some situations, unless otherwise accounted for, it may be possible for deadlock to occur when multiple machines 12 are blocking and waiting at the same time. For example, FIG. 2 illustrates a 2-way deadlock situation. In this situation, the left-most machine 12 is blocking lane $L_3$ in the route of the right-most machine 12, while also waiting for lane $L_2$ that is blocked by the right-most machine 12. In this situation, neither machine 12 can progress. FIG. 3 illustrates an exemplary 3-way deadlock situation. In this situation, the lower-most machine 12 is blocking lane $L_6$, while waiting for lane $L_2$ to clear. Likewise, the upper-left machine 12 is blocking lane $L_2$, while waiting for lane $L_4$ to clear. And finally, the upper-right machine 12 is blocking lane $L_4$, while waiting for lane $L_6$ to clear. As in the example of FIG. 2, none of the machines 12 shown in FIG. 3 can progress. Although less likely, it may be possible for higher-order deadlock situations to also occur.

As shown in the flowchart of FIG. 5, worksite controller 38 may account for potential deadlock situations in steps 410 and 420. Specifically, worksite controller 38 may add the identity of all machines 12 currently blocking a lane in the route R of machine $m_1$ to a set {M} (Step 410). The set {M}, at this time, may represent a list of machines 12 having a potential for 2-way deadlock with machine $m_1$. In the simplified example of FIG. 2, assuming that the machine 12 shown on the left is machine $m_1$ (i.e., the machine for which the process of FIG. 5 is currently being performed), the set {M} after completion of step 410 would include only the machine 12 on the right. In the simplified example of FIG. 3, assuming that the lower-most machine 12 is machine $m_1$, the set {M} after the completion of step 410 would include only the machine 12 on the upper-left.

After completion of step 410, worksite controller 38 may then add the identity of all machines 12 currently blocking a lane in the route of any machine already in the set {M} to the set {M} (Step 420). With regard to the example of FIG. 2, no additional machines 12 would be added to the set {M}, as no other machines 12 are shown. However, with regard to the example of FIG. 3, the machine 12 shown in the upper-right would be added at step 420, as that machine 12 is currently blocking the lane of the machine 12 shown in the upper-left (which is already in the set {M}). Thus, for the example of FIG. 3, after completion of step 420, the set {M} would contain the upper-left and the upper-right machines 12. Step 420, when completed the first time for machine $m_1$, may function as a check for potential 3-way deadlocks. It should be noted that step 420 may be completed additional times, if desired, to provide for checking of higher-order deadlock potential.

After the completion of steps 410 and 420, worksite controller 38 may then add any not-yet-traveled lanes in the assigned routes of the machines 12 in the set {M}, other than the blocking lanes, to a set {L} (Step 430). The set {L} may represent a list of lanes that, if stopped in by machine $m_1$, has the potential to cause deadlock (e.g., 2-way, 3-way, or higher order deadlock) with other machines 12. Returning to the example of FIG. 2, the lane $L_3$ would be added to the set {L} at step 430. In the example of FIG. 3, the lanes $L_4$, and $L_6$ would be added to the set {L}.

Worksite controller 38 may then determine if the variable i (initialized in step 400) is greater than a variable n (a number of lanes in the route of machine $m_1$) (Step 400). The first time that the process of FIG. 5 is followed for machine $m_1$, the variable i will not be greater than the variable n. However, when the process is completed enough times unsuccessfully (as will be described in more detail below) and the variable i does become greater than the variable n, worksite controller 38 may end the process of FIG. 5. That is, worksite controller 38 may conclude that travel for machine $m_1$ is not currently possible, and no lane travel permissions will be granted to machine $m_1$ (Step 450). Accordingly, machine $m_1$ must remain stationary at its current location, and control may return to step 400.

However, when it is determined at step 440 that the variable i is less than the variable n (i.e., that the process of FIG. 5 has been completed fewer times than there are lanes in the route of machine $m_1$) worksite controller 38 may determine if the lane $L_i$ in the route of machine $m_1$ is currently being blocked by another machine 12 (Step 460). When lane $L_i$ is blocked by another machine 12, permission for travel in that lane (or any subsequent lane past the blocked lane) may not be granted. Accordingly, control may move from step 460 to step 450.

When worksite controller 38 determines that the lane $L_i$ is currently open and clear (i.e., not blocked by another machine 12—Step 460:N), worksite controller 38 may determine if lane Li is suitable for machine $m_1$ to stop in. That is, worksite controller 38 may determine, among other things, if machine $m_1$ can fit fully in the lane $L_i$ (Step 470). In some applications, stopping suitability of lane $L_1$ may also be determined based on a required stopping distance of machine $m_1$, a slope of lane $L_1$, ground conditions within lane $L_1$, etc. If lane Li is unsuitable for stopping in (e.g., if machine $m_1$ would extend from the lane $L_i$ into another lane if stopped in lane $L_i$—Step 470:N), worksite controller 38 may add the lane $L_i$ to the list of permissions to be granted, and increment the variable i (Step 480). By granting permission for machine $m_1$ to travel through lane $L_i$, worksite controller 38 may be ensuring that machine $m_1$ does not stop in lane $L_i$. Control may advance from step 480 to step 440, where a next lane in the route R of machine $m_1$ scrutinized.

Returning to step 470, when worksite controller 38 determines that the lane $L_i$ is suitable for stopping in, worksite controller 38 may then determine if stopping in lane $L_i$ would create the potential for deadlock. That is, worksite controller 38 may check to see if the lane $L_i$ intersects with another lane found in the set {L} (Step 490). When the lane $L_i$ intersects with another lane found in the set {L}, worksite controller 38 may grant permission for travel of machine $m_1$ through the lane $L_i$ (i.e., control may proceed from step 490 to step 480). Permission may be granted to machine $m_1$ for travel through lane $L_i$ when lane $L_i$ intersects with another lane found in the set {L}, to ensure that machine $m_1$ does not stop in the lane of a second machine 12 that is currently blocking another lane of either machine $m_1$ (2-way deadlock) or of yet a third machine 12 that is currently blocking a lane of machine $m_1$ (3-way deadlock). When worksite controller 38 determines at step 490 that lane $L_i$ intersects with another lane found in the set {L}, worksite controller 38 may instead only grant permission for machine $m_1$ to travel into and stop in lane $L_i$ (495). Control may loop from step 495 back to step 400.

A primary goal of steps 440-495 may be to find a closest lane in the route R of machine $m_1$ that is suitable for stopping in and that does not have the potential to cause deadlock with other machines 12 at worksite 10. Machine $m_1$ is then only given permission to travel to and stop within this closest lane. By granting permission to machine $m_1$ for travel to only the closest lane (i.e., and not to a further lane or the entire route R), a fewer number of lanes at worksite 10 may be made unavailable for other machines 12 to travel in. This does not necessarily mean the machine $m_1$ actually stops in every lane in its route R meeting the criteria of steps 470 and 490. Instead, it simply means that onboard controller 36 of machine $m_1$ may need to request additional permission to travel to further lanes. In most instances, this additional permission is requested and granted before machine $m_1$ reaches a braking location and begins to slow down within the closest stoppable lane not having deadlock potential. The braking location may be determined by onboard controller 36 based on signals from locating device 32.

Because the disclosed system may be able to avoid deadlock situations during route determination, an efficiency of the system may be high. In particular, the disclosed system may be able to conserve time and resources by determining a route for each machine 12 at worksite 12 only once, and thereafter selectively granting permissions for travel through lanes found in the route.

It will be apparent to those skilled in the art that various modifications and variations can be made to the traffic control system of the present disclosure. Other embodiments will be apparent to those skilled in the art from consideration of the specification and practice of the traffic control system disclosed herein. It is intended that the specification and examples be considered as exemplary only, with a true scope being indicated by the following claims and their equivalents.

What is claimed is:

1. A traffic control system for use with a plurality of mobile machines at a worksite, the traffic control system comprising:
   a locating device positioned onboard each of the plurality of mobile machines and configured to generate a location signal indicative of a location of a corresponding one of the plurality of mobile machines at the worksite;
   an onboard controller positioned onboard each of the plurality of mobile machines and configured to regulate operation of a corresponding one of the plurality of mobile machines based on the location signal;
   a communication device positioned onboard each of the plurality of mobile machines; and
   an offboard worksite controller in communication with the locating device and the onboard controller via the communication device, the worksite controller being configured to:
   determine a first route for a first of the plurality of mobile machines from a current location to a final destination based on the location signal, the first route including multiple lanes sequentially joined end to end;
   determine if a first lane of the first route is blocked by a second of the plurality of mobile machines;
   determine if a second lane of the first route intersects with a second route of the second of the plurality of mobile machines; and
   selectively grant permission to the onboard controller for travel of the first of the plurality of mobile machines through the second lane prior to reaching the first lane while the first lane is blocked.

2. The traffic control system of claim 1, wherein the worksite controller is further configured to:
   determine if a third lane of the first route intersects a third route of a third of the plurality of mobile machines that is currently blocking the second route; and
   selectively grant permission to the onboard controller for travel of the first of the plurality of mobile machines through the third lane prior to reaching the first lane while the first lane is blocked.

3. The traffic control system of claim 1, wherein the worksite controller is further configured to:
   determine a closest lane in the first route that is suitable for the first of the plurality of mobile machines to stop in; and
   selectively grant permission to the onboard controller for travel to only the closest lane.

4. The traffic control system of claim 3, wherein the onboard controller is further configured to:
   determine, based on the location signal, a braking location within the closest lane at which the first of the plurality of mobile machines should begin slowing travel in order to stop at an end of the closest lane; and
   selectively request permission for further travel before the first of the plurality of mobile machines reaches the braking location.

5. The traffic control system of claim 3, wherein the worksite controller is configured to determine if the closest lane is suitable to stop in based on a length of the closest lane and a known length of the first of the plurality of mobile machines.

6. The traffic control system of claim 5, wherein the worksite controller is configured to determine if the closest lane is suitable to stop in based further on at least one of a required stopping distance of the first of the plurality of mobile machines, a slope of the closest lane, and a ground condition of the closest lane.

7. The traffic control system of claim 1, wherein the worksite controller is configured to stop granting permission to the onboard controller for travel of the first of the plurality of mobile machines when a next lane in the first route is blocked by another of the plurality of mobile machines or is unsuitable for the first of the plurality of mobile machines to stop in.

8. A method for controlling traffic of a plurality of mobile machines operating at a worksite, the method comprising:
   generating location signals indicative of locations of the plurality of mobile machines;
   determining a first route for a first of the plurality of mobile machines from a current location to a final destination based on the location signals, the first route including multiple lanes sequentially joined end to end;
   determining if a first lane of the first route is blocked by a second of the plurality of mobile machines;

determining if a second lane of the first route intersects with a second route of the second of the plurality of mobile machines; and selectively granting permission for travel of the first of the plurality of mobile machines through the second lane prior to reaching the first lane while the first lane is blocked.

9. The method of claim 8, further including:

determining if a third lane of the first route intersects a third route of a third of the plurality of mobile machines that is currently blocking the second route; and selectively granting permission for travel of the first of the plurality of mobile machines through the third lane prior to reaching the first lane while the first lane is blocked.

10. The method of claim 8, further including:

determining a closest lane in the first route that is suitable for the first of the plurality of mobile machines to stop in; and selectively granting permission to the onboard controller for travel to only the closest lane.

11. The method of claim 10, wherein determining the closest lane suitable to stop in includes comparing a length of the closest lane with a known length of the first of the plurality of mobile machines.

12. The method of claim 10, wherein determining if the closest lane is suitable to stop in further includes determining a required stopping distance of the first of the plurality of mobile machines, a slope of the closest lane, and a ground condition of the closest lane.

13. The method of claim 10, further including:

determining, based on the location signals, a braking location within the closest lane at which the first of the plurality of mobile machines should begin slowing travel in order to stop at an end of the closest lane; and selectively requesting permission for further travel before the first of the plurality of mobile machines reaches the braking location.

14. The method of claim 8, further including stopping the granting of permission for travel of the first of the plurality of mobile machines when a next lane in the first route is blocked by another of the plurality of mobile machines or is unsuitable for the first of the plurality of mobile machines to stop in.

15. A non-transitory computer readable medium containing computer-executable programming instructions for performing a method of traffic control for a plurality of mobile machines operating at a worksite, the method of traffic control comprising:

generating location signals indicative of locations of the plurality of mobile machines at the worksite;

determining a plurality of routes for the plurality of mobile machines based on the location signals, each of the routes including multiple lanes sequentially joined end to end;

determining if a first lane of a first route associated with a first of the plurality of mobile machines is blocked by a second of the plurality of mobile machines;

determining if a second lane of the first route interferes with a second route of the second of the plurality of mobile machines; and selectively causing the first of the plurality of mobile machines to stop in a lane of the first route other than the second lane prior to reaching the first lane while the first lane is blocked.

16. The non-transitory computer readable medium of claim 15, wherein the method further includes:

determining if a third lane of the first route intersects a third route of a third of the plurality of mobile machines that is currently blocking the second route; and selectively granting permission for travel of the first of the plurality of mobile machines through the third lane prior to reaching the first lane while the first lane is blocked.

17. The non-transitory computer readable medium of claim 15, wherein the method further includes:

determining a closest lane in the first route that is suitable for the first of the plurality of machines to stop in; and selectively granting permission to the onboard controller for travel to only the closest lane.

18. The non-transitory computer readable medium of claim 17, wherein determining the closest lane suitable to stop in includes comparing a length of the closest lane with a known length of the first of the plurality of mobile machines.

19. The non-transitory computer readable medium of claim 18, wherein determining if the closest lane is suitable to stop in further includes determining a required stopping distance of the first of the plurality of mobile machines, a slope of the closest lane, and a ground condition of the closest lane.

20. The non-transitory computer readable medium of claim 17, wherein the method further includes:

determining, based on the location signals, a braking location within the closest lane at which the first of the plurality of mobile machines should begin slowing travel in order to stop at an end of the closest lane; and selectively requesting permission for further travel before the first of the plurality of mobile machines reaches the braking location.

\* \* \* \* \*